Dec. 6, 1955  T. W. KNACKE  2,726,057
RIBBON COVERED BREATHING VENT FOR PARACHUTE
Filed Dec. 28, 1954
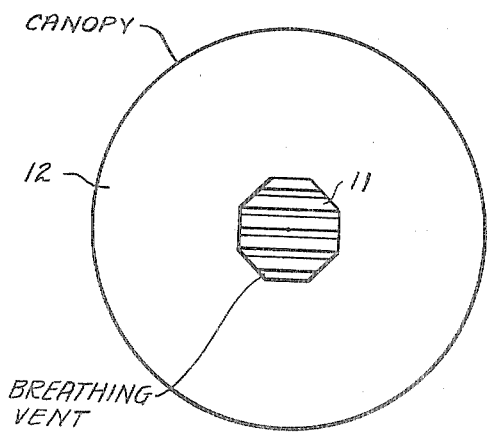
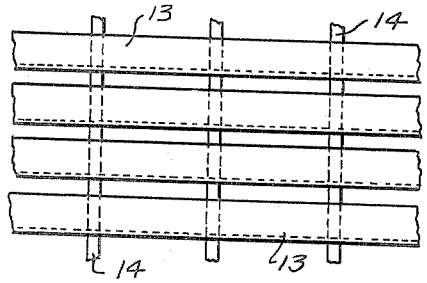
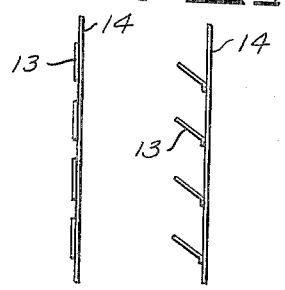
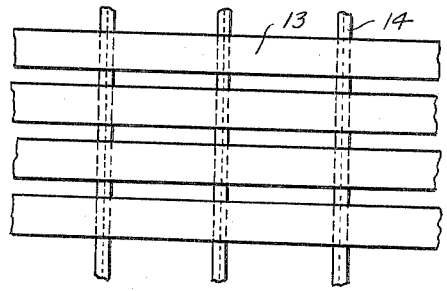
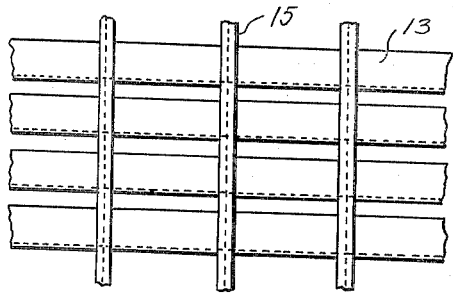
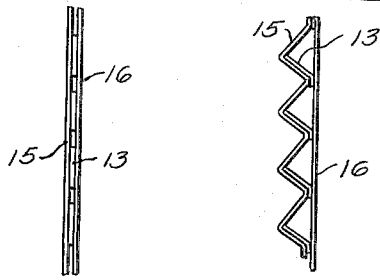
INVENTOR.
THEODOR W. KNACKE
BY Lloyd B. Stevens, Jr.
Wade Koontz
AND
ATTORNEYS

United States Patent Office 2,726,057
Patented Dec. 6, 1955

2,726,057

RIBBON COVERED BREATHING VENT FOR PARACHUTE

Theodor W. Knacke, El Centro, Calif.

Application December 28, 1954, Serial No. 478,217

16 Claims. (Cl. 244—145)

(Granted under Title 35, U. S. Code (1952), sec. 266)

The invention described herein may be manufactured and used by or for the United States Government for governmental purposes without payment to me of any royalty thereon.

This invention relates to parachutes and more specifically to an improvement in parachutes in which the initial shock and the initial high air pressure concentration encountered on the opening of the parachute are lessened or substantially eliminated.

To persons versed in the art it is known that the opening of a conventional type parachute is accomplished by a shock resulting from the decelerating force applied by the parachute at the moment of opening to the load carried by it.

This force results from the air pressure on the parachute which reaches a maximum soon after the opening of the parachute and drops to minimum as the load is decelerated. It is further known that the force or air pressure concentration is greatest at the apex or in the center of the parachute. Conventional type parachutes have vents at this point for purposes of releasing air pressure and for purposes of stability. Any increase in the size of vents allows more air to escape but also permits a greater rate of descent. Similarly, a greater load results in greater air pressure in the region of the vent, and also results in a greater rate of descent, and a greater shock upon opening.

Known means to achieve a low opening shock on parachutes are:

1. Increase the filling time of the canopy.
2. Use reefing, which is basically a variation of 1.
3. Install a pressure relief valve at the point of highest canopy pressure.
4. Provide for critical opening speeds of the parachute.

Long filling times have been reached by high total porosity as on ribbon parachutes or by the use of opening brakes, such as inside curved leading edges of the canopy, utilized on "Guide Surface" and "Extended Skirt" parachutes; but these designs have the disadvantages that either the drag coefficient is very low or the opening shock decrease is not sufficient.

Reefing has been proven successful and reliable, but it requires hardware in the canopy, replacement parts and increased maintenance.

Decrease of the high pressure peak has been obtained through:

1. A temporary increase in porosity as on ribbon parachutes with long vertical ribbons, but this is connected with a loss in drag coefficient.
2. A temporary increase in vent area by use of rubber or spring elements. These methods were up to now only partially successful; moreover, the installation of hardware or rubber in the canopy is not preferred.

Parachutes with a critical opening speed have been tested in wind tunnels. High porosity solid flat and ribbon parachutes have been built which open at low speeds, close at high speeds and open again at low speeds. Not much has been done, however, to develop full size parachutes with a critical opening speed. How far this critical opening speed can be utilized in actual repeated drop tests with various parachutes is unknown: it can be assumed, however, that such parachutes would have to be built with very close tolerances and would need a high porosity which again decreases the drag coefficient.

With these defects in view it is one object of this invention to provide a parachute which will operate to open when ejected from the aircraft traveling at high rates of speed without subjecting the canopy to excessive impact forces on opening.

Another object of this invention is to provide a parachute which will reduce the initial shock applied to the load on the opening of the parachute.

Still another object of this invention is to eliminate the concentration of high air pressure on the apex of the canopy as normally encountered on the opening of the parachute, and to permit a conventional rate of descent as the initial shock of opening has subsided.

An additional object of my invention is to reduce opening shock to the parachute and load without the use of metal, rubber or plastic parts.

A further object of my invention is to provide a parachute requiring low maintenance yet having low opening shock.

A particular object of my invention is to provide a temporary large increase in porosity near the apex of the parachute when pressure is highest and low porosity when pressure is lowest, i. e., during normal descent, and yet not suffer a substantial loss in drag coefficient.

Other objects and advantages of the invention will become apparent from the following detailed description taken in connection with the accompanying drawings.

Broadly my invention is a parachute having an improved breathing vent which is designed to give very high porosity when the parachute canopy is subjected to high pressures as at a time shortly after the opening of the parachute and low porosity during the normal descent of parachute at which time the parachute canopy is subjected to low pressures. My improved breathing vent comprises a grid-like structure located in the center portion of the canopy of the parachute. It is the center portion of the canopy that is subjected to the highest pressure upon the opening of the chute. This grid-like structure is made up of a number of substantially parallel main ribbons and a number of auxiliary ribbons which are substantially perpendicular to the main ribbons. It will be obvious from the detailed description of the invention that the invention would still operate with the auxiliary ribbons crossing the main ribbons at angles less than perpendicular, although the perpendicular intersection is preferred, so the word substantially has been used; likewise it is obvious that the main ribbons need not be exactly parallel to one another; however, it is undesirable that the main ribbons overlap one another to any extent. The width of each main ribbon is substantially greater than the distance between two adjacent main ribbons; whereas, the width of an auxiliary ribbon is substantially smaller than the distance between two adjacent auxiliary ribbons. The main ribbons are attached to the auxiliary ribbons at least at one point on the main ribbons. The main ribbons and the auxiliary ribbons may be "Nylon" or other suitable material, and the ribbons may be attached by "Nylon" thread stitching or other suitable means.

Figure 1 is a plan view of a parachute canopy showing the breathing vent.

Figure 2 is a partial plan view of the breathing vent.

Figure 3 is a side elevation view of the embodiment of the breathing vent shown in Figure 2 wherein the breathing vent is subjected to low pressure.

Figure 4 is a side elevation view of the embodiment of the breathing vent shown in Figure 2 wherein the breathing vent has been subjected to high pressure.

Figure 5 is a partial plan view of another embodiment of my invention which is a variation of that shown in Figures 2, 3 and 4.

Figure 6 is a partial plan view of still another embodiment of my invention.

Figure 7 is a side elevation view of the embodiment of my invention shown in Figure 6 wherein the vent has been subjected to low pressure.

Figure 8 is a side elevation view of the embodiment of my invention shown in Figure 6 wherein the vent has been subjected to high pressure.

Figure 1 shows the location of breathing vent 11 in the center portion of canopy 12 of the parachute. The reason for the location of breathing vent 11 at this point is that it is the center portion of the parachute that is subjected to the greatest pressure at a time shortly after the opening of the parachute. Therefore, it is at this point that there is a need to quickly vent air and relieve this pressure. It is desirable to provide a breathing vent with high porosity when subjected to high pressure and low porosity at low pressure, when the parachute is making its normal descent.

One embodiment of my invention is described in Figures 2, 3, and 4. Main ribbons 13 are shown substantially parallel to one another. The width of one of these ribbons is substantially greater than the distance between two adjacent main ribbons. For example: a main ribbon may have a width of about four times the distance between two adjacent main ribbons, a main ribbon width of about 2 inches being satisfactory. Main ribbons 13 are preferably attached at both ends to canopy 12.

Auxiliary ribbons 14 are shown substantially perpendicular to main ribbon 13; however, the width of an auxiliary ribbon is substantially less than the distance between two adjacent auxiliary ribbons. In fact, the width of an auxiliary ribbon should be insignificant as compared to the distance between two adjacent auxiliary ribbons. Auxiliary ribbons 14 are preferably fastened at both ends to canopy 12. Auxiliary ribbons 14 may be attached to ribbons 13 by stitching at a point near one edge of main ribbons 13. This stitching may be local stitching along one edge only of main ribbons 13, or rows of stitching along an entire edge of a main ribbon. Auxiliary ribbons 14 are preferably attached at points near the same edge of each main ribbon. This allows main ribbons 13 to pivot in a hinge-like fashion on auxiliary ribbons 14 and one edge of each main ribbon is free to move up and down. When parachute canopy 12 is subjected to high pressure as at the time of the opening of the parachute, the high pressure on the under side of canopy 12 causes each main ribbon to pivot or turn upward along one of its edges, and the porosity of breathing vent 11 is very substantially increased and air flows rapidly through breathing vent 11 to quickly reduce the pressure and the strain on canopy 12. As the parachute begins its normal descent the pressure on canopy 12 is reduced to a low pressure. This low pressure is not sufficient to raise main ribbons 13 so air may escape only through the space between main ribbons 13. This represents a normal venting for the parachute in its descent.

Another embodiment of my invention is shown in Figure 5. In this embodiment auxiliary ribbons 14 are joined preferably by stitching in auxiliary ribbons 14 across the width of main ribbons 13. This design could be used, if it is desired to restrain the turning of the main ribbons 13 more than in the first embodiment.

Still another embodiment of my invention is shown in Figures 6, 7 and 8. In this embodiment of my invention the auxiliary ribbons are made of at least two parallel parts called upper auxiliary strips 15 and lower auxiliary strips 16. Upper auxiliary strips 15 are made of high elongation material; whereas, lower auxiliary strips 16 are made of low elongation material. Auxiliary strips 15 and 16 are joined to main ribbons 13 by stitching along one edge of each main ribbon or by local stitching along one edge of each main ribbon; and upper auxiliary strips 15 are further joined to main ribbons 13 by stitching in the upper auxiliary strips 15 across the width of main ribbons 13. As shown, main ribbons 13 are sandwiched between auxiliary strips 15 and 16. When the parachute canopy is subjected to high pressure on the under side, main ribbons 13 tend to pivot upward pivoting along one edge of main ribbons 13. Upper auxiliary strips 15 resist the opening upward of main ribbons 13, but main ribbons 13 are able to open upward due to the strecthing of upper auxiliary strips 15. The resistance to the turning of main ribbons 13 may be increased or decreased by varying the thickness of upper auxiliary ribbons 15 and/or the type of material, which may be elastic nylon, rubber, or other elastic material. As the air is vented from breathing vent 11 the pressure is reduced and upper auxiliary strips 15, due to their elastic nature, tend to force main ribbons 13 down to their normal position in which the free edge of main ribbons 13 is in contact or near contact with lower auxiliary strips 16. As the parachute continues its normal descent, the only area that is available for venting air from parachute breathing vent 11 is the spaces between main ribbons 13.

Some satisfactory dimensions of my parachute breathing vent 11 are as follows: a satisfactory parachute breathing vent should have a diameter approximately ⅓ to ⅜ of the inflated parachute diameter. Breathing vents having shapes other than circular, e. g., octagonal, etc., may be used and their total area should be approximately equal to the area of the circular vent. This means that approximately 4.5% to 6.5% of canopy 12 total surface area (includes breathing vent area) will be covered by breathing vent 11. In the normal parachute having a 28 foot flat diameter canopy, breathing vent 11 will have about a 6 to 7 foot diameter.

In any event the overall porosity (includes canopy 12 and breathing vent 11), should not be greater than about 25%, or the chute will not open. The material proper of canopy 12 normally has appreciable porosity whether it be nylon or other material, whereas the ribbons themselves of my breathing vent 11 will normally have no appreciable porosity although they may if desired.

A suitable design for a flat parachute is one in which breathing vent 11 diameter is about 7 feet for a 28 foot flat diameter canopy. As its name implies, the canopy of a flat parachute will lie flat when spread out on the ground. Main ribbons 13 are about 2 inches wide and ½ inch apart to give a vent porosity at low pressure of about 25%. Based on the total surface area of parachute canopy 12, the area of breathing vent 11 is about 6.3% and the porosity of breathing vent 11 is about 1.6% at low pressure. If all main ribbons 13 in breathing vent 11 turn 45°, the porosity of breathing vent 11 will increase to approximately 70% based on breathing vent 11 area and to approximately 4.4% based on the total surface area of parachute canopy 12. If main ribbons 13 turn 60°, the respective values will be 90% and 5.7%.

While I have described preferred embodiments of my invention, many modifications and alternative arrangements and procedures will be apparent from the above description to those skilled in the art.

I claim:

1. A parachute having a breathing vent located in the center portion of the canopy and an overall porosity of the canopy and breathing vent of not more than about 25%, said breathing vent comprising substantially parallel main ribbons, said main ribbons each having a width substantially greater than the distance between two adjacent main ribbons, auxiliary ribbons substantially perpendicular to said main ribbons, said auxiliary ribbons being separated from one another by a distance substantially greater than the width of an auxiliary ribbon, said auxiliary ribbons being attached to said main ribbons and said main ribbons being so structurally constituted that their free-edges will bend upward when the canopy is subjected to high pressures as at the time of opening of the parachute or shortly thereafter to substantially increase the open space for the escape of air and will not bend upward appreciably at the low pressures to which the parachute canopy is subjected during normal descent.

2. The parachute of claim 1 wherein said auxiliary ribbons are attached to said main ribbons near one edge only of said main ribbons.

3. The parachute of claim 1 wherein said auxiliary ribbons are attached across the entire width of said main ribbons.

4. The parachute of claim 1 wherein said auxiliary ribbons are composed of at least two parallel parts called upper auxiliary strips and lower auxiliary strips, said upper strips being made of material having substantial elasticity and said lower strips being made of material having no appreciable elasticity, said lower strips being attached to said main ribbons near one edge only of said main ribbons, and said upper strips being attached to said main ribbons across the entire width of said main ribbons.

5. A parachute having a breathing vent located in the center portion of the canopy and an overall porosity of the canopy and breathing vent of not more than about 25%, said breathing vent having an area of about 4.5% to about 6.5% of the total canopy area comprising substantially parallel main ribbons, said main ribbons each having a width substantially greater than the distance between two adjacent main ribbons, auxiliary ribbons substantially perpendicular to said main ribbons, said auxiliary ribbons being separated from one another by a distance substantially greater than the width of an auxiliary ribbon, both ends of each of said main and auxiliary ribbons being attached to said canopy, and each of said auxiliary ribbons being attached to each of said main ribbons.

6. The parachute of claim 5 wherein said auxiliary ribbons are attached to said main ribbons near one edge only of said main ribbons.

7. The parachute of claim 5 wherein said auxiliary ribbons are attached across the width of said main ribbons.

8. The parachute of claim 5 wherein said auxiliary ribbons are composed of at least two parallel parts called upper auxiliary strips and lower auxiliary strips, said upper strips being made of material having substantial elasticity and said lower strips being made of material having no appreciable elasticity, said lower strips being attached to said main ribbons along one edge only of said main ribbons, and said upper strips being attached to said main ribbons across the width of said main ribbons.

9. The parachute of claim 5 where said parachute is a flat type parachute.

10. The parachute of claim 9 wherein said auxiliary ribbons are attached to said main ribbons near one edge only of said main ribbons.

11. The parachute of claim 9 wherein said auxiliary ribbons are attached across the width of said main ribbons.

12. The parachute of claim 9 wherein said auxiliary ribbons are composed of at least two parallel parts called upper auxiliary strips and lower auxiliary strips, said upper strips being made of material having substantial elasticity and said lower strips being made of material having no appreciable elasticity, said lower strips being attached to said main ribbons along one edge only of said main ribbons, and said upper strips being attached to said main ribbons across the width of said main ribbon.

13. A flat type parachute having a breathing vent located in the center portion of the canopy, said canopy having a flat diameter of about 28 feet and said vent having a diameter of about 7 feet, said vent having a surface area of about 6.3% of the total surface area of said canopy, said breathing vent comprising substantially parallel main ribbons, said main ribbons each having a width of about 2 inches and adjacent main ribbons being separated by a distance of about ½ inch, auxiliary ribbons substantially perpendicular to said main ribbons, said auxiliary ribbons being separated from one another by a distance substantially greater than the width of an auxiliary ribbon, both ends of each of said main and auxiliary ribbons being attached to said canopy, each of said auxiliary ribbons being attached by stitching to each of said main ribbons, said vent having a porosity of about 1.6% of the total surface area of said canopy when said main ribbons are not turned, a porosity of about 4.4% when said main ribbons are turned about 45°, and a porosity of about 5.7% when said ribbons are turned about 60%.

14. The parachute of claim 13 wherein said auxiliary ribbons are attached by stitching to said main ribbons near one edge only of said main ribbons.

15. The parachute of claim 13 wherein said auxiliary ribbons are attached to said main ribbons by stitching across the entire width of said main ribbons.

16. The parachute of claim 13 wherein said auxiliary ribbons are composed of at least two parallel parts called upper auxiliary strips and lower auxiliary strips, said upper strips being made of material having substantial elasticity and said lower strips being made of material having no appreciable elasticity, said lower strips being attached to said main ribbons by stitching along one edge only of said main ribbons and said upper strips being attached to said main ribbons by stitching across the width of said main ribbons.

References Cited in the file of this patent

UNITED STATES PATENTS

| | | |
|---|---|---|
| 2,358,233 | Jorgensen | Sept. 12, 1944 |
| 2,527,553 | Ingels | Oct. 31, 1950 |
| 2,651,481 | Steinthal | Sept. 8, 1953 |

FOREIGN PATENTS

| | | |
|---|---|---|
| 1,044,389 | France | June 17, 1953 |